Patented Apr. 30, 1946

2,399,192

UNITED STATES PATENT OFFICE 2,399,192

DEHYDRATION OF TRANSFORMER OILS

Peter P. Alexander, Marblehead, Mass., assignor to Metal Hydrides Incorporated, Beverly, Mass., a corporation of Massachusetts No Drawing. Application April 1, 1944,
Serial No. 529,233

16 Claims. (Cl. 196—4)

This invention relates to the dehydration of transformer oils and has for its object certain improvements in the method of dehydrating or drying transformer oils.

It is very important that oils or other organic liquids employed as a cooling agent in transformers be substantially completely free of all water. The greatest enemy to successful operation of transformers in general, and high voltage transformers in particular, is the presence of moisture; so much as 0.1% of moisture in the oil renders it unfit for use. The maximum allowable moisture in a high voltage transformer is 0.04%. The decrease of dielectric strength of a transformer oil is very rapid with the increase of moisture content in the oil, particularly when passing from a dry oil to a moisture content of approximately one part in ten thousand. Of such importance is a dry oil that it is placed in transformers in dry weather.

Various proposals have been advanced to remove the small amounts of moisture in transformer oils. One is to treat the oil with sodium, which reacts energetically with the water. Sodium reacts with water with explosive violence. The reaction is not only dangerous but it generates heat which tends objectionably to break down the oil. This method has found little or no commercial use. It has also been proposed to utilize the hygroscopic property of calcium chloride. It is not only inefficient, but a certain amount of the calcium chloride accompanies the transformer oil and tends to corrode the transformer. Another method, which is used commercially, is to circulate the oil under pressure through a succession of pieces of blotting or filter paper. This method has its obvious disadvantages. The blotting or filter paper does not have a wholly selective action for the water and of course absorbs much of the oil.

As a result of my investigations, I have discovered that transformer oils may be readily treated to remove the last traces of water. This can be done selectively and in such a way as not objectionably to break down the liquid to be dehydrated.

In accordance with the invention, a transformer oil containing a small amount of moisture is treated with a suitable metal hydride, the metal hydride being employed in amount sufficient to react with the moisture present in the transformer oil.

When the transformer oil to be dehydrated contains a relatively small amount of moisture, usually traces, the metallic hydride reacts with the moisture to form metal oxide and hydrogen. The hydrogen is permitted to escape as a gas from the body of oil. If there is more than a trace of moisture present in the transformer oil, there is a tendency for metal hydroxide to be formed.

It is usually advantageous to select a metal hydride which reacts with the moisture in the transformer oil at ordinary temperatures. Among the metal hydrides particularly suitable under such conditions are the alkali metal hydrides, such as sodium hydride, potassium hydride and lithium hydride, and the alkaline-earth metal hydrides, such as calcium hydride, barium hydride and strontium hydride. In general the use of the alkali metal hydrides is less desirable because of their instability and their tendency to react too energetically. The alkaline-earth metal hydrides are generally better adapted for this purpose. Calcium hydride is the cheaper and more readily available metallic hydride for dehydration purposes. While relatively pure metal hydrides may be employed, the so-called impure metal hydrides are frequently more desirable because they have a tendency to react less energetically. This is particularly true, for example, of calcium hydride made by the magnesium process; that is, by the reaction of magnesium with calcium oxide, lime, in the presence of hydrogen gas.

Various procedures may be followed in dehydrating the transformer oils. It is important to insure intimate contact of the transformer oil with the metal hydride so that the metal hydride is in turn brought into contact with the moisture. This can be effected by crushing the metal hydride into a fine powder and mixing it with the transformer oil in a container. The admixed oil and metal hydride are permitted to stand for a while so that the solids settle to the bottom of the container, after which the dehydrated oil is decanted and, if desired, filtered to remove any remaining solids. To separate the last fine solid particles from the dehydrated oil, it may be desirable to distill the oil, for example, in vacuum, so that all traces of the fine solid particles are left behind.

Another method of using the metal hydride to dehydrate transformer oil is to force the oil slowly through a bed of crushed metal hydride, for example, in a filter press or similar apparatus. A more efficient method is to boil the oil in vacuum and to pass the resulting vapors of the oil and moisture through a bed of crushed metal hydride. The temperature of the bed should be kept below that at which the metallic hydride dissociates.

If the transformer oil is treated with calcium hydride, for example, at ordinary temperatures in a container, the calcium hydride reacts with the moisture present in the transformer oil to form calcium oxide and hydrogen. The hydrogen is permitted to rise as a gas to the top surface of the body of transformer oil and escape into the open atmosphere, while the calcium oxide settles at the bottom of the container. The transformer oil is preferably admixed intimately with finely divided calcium hydride. The dehydrated transformer oil is decanted and filtered to remove the last traces of solid particles. It may sometimes be desirable to separate the last fine solid particles from the transformer oil by distilling the oil, preferably in vacuum, and condensing the resulting vapors separate from the fine solid particles.

The transformer oil may, for example, be forced slowly through a bed of calcium hydride. Another method is to distill the transformer oil, preferably in vacuum, and pass the resulting oil and water vapors through a bed of finely divided calcium hydride. The particle size of the calcium hydride should, of course, be such as to provide the necessary interstices or passageways so that the oil may be passed therethrough either in liquid or vapor form. The temperature of the calcium-hydride bed should be kept below that at which the calcium hydride dissociates into metallic calcium and hydrogen so that the calcium hydride is available to react with the moisture, either in its liquid or vapor form, when they are brought into contact with one another.

I claim:

1. In the method of dehydrating transformer oil containing a small amount of moisture, the improvement which comprises boiling the transformer oil in vacuum, passing the resulting vapors of oil and moisture through a body of calcium hydride maintained at a temperature below that at which the calcium hydride dissociates, condensing the oil vapors, permitting the hydrogen resulting from the reaction to escape as a gas from the transformer oil, and separating the dehydrated transformer oil from the solids resulting from the reaction.

2. In the method of dehydrating transformer oil containing a small amount of moisture, the improvement which comprises passing the transformer oil through a body of finely divided calcium hydride to bring the moisture into intimate reactive contact therewith, permitting the hydrogen resulting from the reaction to escape as a gas from the transformer oil, and separating the dehydrated transformer oil from the solids resulting from the reaction.

3. In the method of dehydrating transformer oil containing a small amount of moisture, the improvement which comprises intimately admixing the calcium hydride and transformer oil to bring the moisture into reactive contact with the calcium hydride, permitting the hydrogen resulting from the reaction to escape as a gas from the transformer oil, and separating the dehydrated transformer oil from the solids resulting from the reaction.

4. In the method of dehydrating transformer oil containing a small amount of moisture, the improvement which comprises bringing the transformer oil and hence its moisture into intimate reactive contact with calcium hydride, permitting the hydrogen resulting from the reaction to escape as a gas from the transformer oil, and separating the dehydrated transformer oil from the solids resulting from the reaction.

5. In the method of dehydrating transformer oil containing a small amount of moisture, the improvement which comprises boiling the transformer oil in vacuum, passing the resulting vapors of oil and moisture through a body of an alkaline earth metal hydride maintained at a temperature below that at which the alkaline earth metal hydride dissociates, condensing the oil vapors, permitting the hydrogen resulting from the reaction to escape as a gas from the transformer oil, and separating the dehydrated transformer oil from the solids resulting from the reaction.

6. In the method of dehydrating transformer oil containing a small amount of moisture, the improvement which comprises passing the transformer oil through a body of finely divided alkaline earth metal hydride to bring the moisture into intimate reactive contact therewith, permitting the hydrogen resulting from the reaction to escape as a gas from the transformer oil, and separating the dehydrated transformer oil from the solids resulting from the reaction.

7. In the method of dehydrating transformer oil containing a small amount of moisture, the improvement which comprises intimately admixing an alkaline earth metal hydride and transformer oil to bring the moisture into reactive contact with the alkaline earth metal hydride, permitting the hydrogen resulting from the reaction to escape as a gas from the transformer oil, and separating the dehydrated transformer oil from the solids resulting from the reaction.

8. In the method of dehydrating transformer oil containing a small amount of moisture, the improvement which comprises bringing the transformer oil and hence its moisture into intimate reactive contact with an alkaline earth metal hydride, permitting the hydrogen resulting from the reaction to escape as a gas from the transformer oil, and separating the dehydrated transformer oil from the solids resulting from the reaction.

9. In the method of dehydrating transformer oil containing a small amount of moisture, the improvement which comprises boiling the transformer oil in vacuum, passing the resulting vapors of oil and moisture through a body of an alkali metal hydride maintained at a temperature below that at which the alkali metal hydride dissociates, condensing the oil vapors, permitting the hydrogen resulting from the reaction to escape as a gas from the transformer oil, and separating the dehydrated transformer oil from the solids resulting from the reaction.

10. In the method of dehydrating transformer oil containing a small amount of moisture, the improvement which comprises passing the transformer oil through a body of finely divided alkali metal hydride to bring the moisture into intimate reactive contact therewith, permitting the hydrogen resulting from the reaction to escape as a gas from the transformer oil, and separating the dehydrated transformer oil from the solids resulting from the reaction.

11. In the method of dehydrating transformer oil containing a small amount of moisture, the improvement which comprises intimately admixing an alkali metal hydride and transformer oil to bring the moisture into reactive contact with the alkali metal hydride, permitting the hydrogen resulting from the reaction to escape as a gas from the transformer oil, and separating the dehydrated transformer oil from the solids resulting from the reaction.

12. In the method of dehydrating transformer oil containing a small amount of moisture, the improvement which comprises bringing the transformer oil and hence its moisture into intimate reactive contact with an alkali metal hydride, permitting the hydrogen resulting from the reaction to escape as a gas from the transformer oil, and separating the dehydrated transformer oil from the solids resulting from the reaction.

13. In the method of dehydrating transformer oil containing a small amount of moisture, the improvement which comprises boiling the transformer oil in vacuum, passing the resulting vapors of oil and moisture through a body of a metal hydride maintained at a temperature below that at which the metal hydride dissociates, condensing the oil vapors, permitting the hydrogen resulting from the reaction to escape as a gas from the transformer oil, and separating the dehydrated transformer oil from the solids resulting from the reaction.

14. In the method of dehydrating transformer oil containing a small amount of moisture, the improvement which comprises passing the transformer oil through a body of finely divided metal hydride to bring the moisture into intimate reactive contact therewith, permitting the hydrogen resulting from the reaction to escape as a gas from the transformer oil, and separating the dehydrated transformer oil from the solids resulting from the reaction.

15. In the method of dehydrating transformer oil containing a small amount of moisture, the improvement which comprises intimately admixing a metal hydride and transformer oil to bring the moisture into reactive contact with the metal hydride, permitting the hydrogen resulting from the reaction to escape as a gas from the transformer oil, and separating the dehydrated transformer oil from the solids resulting from the reaction.

16. In the method of dehydrating transformer oil containing a small amount of moisture, the improvement which comprises bringing the transformer oil and hence its moisture into intimate reactive contact with a metal hydride, permitting the hydrogen resulting from the reaction to escape as a gas from the transformer oil, and separating the dehydrated transformer oil from the solids resulting from the reaction.

PETER P. ALEXANDER.